(12) United States Patent
Bar Eliyahu et al.

(10) Patent No.: US 12,505,313 B1
(45) Date of Patent: Dec. 23, 2025

(54) MACHINE LEARNING MODEL DYNAMIC PROMPT ENGINEERING

(71) Applicant: INTUIT INC., Mountain View, CA (US)

(72) Inventors: Natalie Bar Eliyahu, Azor (IL); Noa Haas, Kfar Glickson (IL); Balachandra Maddina, Fremont, CA (US); Shon Mendelson, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/286,498

(22) Filed: Jul. 31, 2025

(51) Int. Cl.
*G06F 40/40* (2020.01)
*G06F 40/20* (2020.01)

(52) U.S. Cl.
CPC .............. *G06F 40/40* (2020.01); *G06F 40/20* (2020.01)

(58) Field of Classification Search
CPC ................................. G06F 40/40; G06F 40/20
USPC ............................................................ 704/9
See application file for complete search history.

(56) References Cited

U.S. PATENT DOCUMENTS

| | | | | |
|---|---|---|---|---|
| 12,412,051 | B1 * | 9/2025 | Srivathsan | G06F 40/58 |
| 2025/0016387 | A1 * | 1/2025 | Beaufays | G10L 15/28 |
| 2025/0060944 | A1 * | 2/2025 | Radhakrishna | G06F 40/35 |
| 2025/0117587 | A1 * | 4/2025 | Joynt | G06F 16/2455 |
| 2025/0139387 | A1 * | 5/2025 | Jang | G06F 40/40 |
| 2025/0165247 | A1 * | 5/2025 | Muthu | G06F 8/658 |
| 2025/0265087 | A1 * | 8/2025 | Wang | G06N 20/00 |
| 2025/0265447 | A1 * | 8/2025 | Li | G06F 16/3331 |
| 2025/0272062 | A1 * | 8/2025 | Kehres | G06F 8/33 |

FOREIGN PATENT DOCUMENTS

WO    WO-2025136527 A1 *    6/2025    ............... G06N 3/09

* cited by examiner

*Primary Examiner* — Edwin S Leland, III
(74) *Attorney, Agent, or Firm* — Patterson + Sheridan, LLP

(57) ABSTRACT

Techniques described herein involve dynamic prompt engineering using machine learning models. Embodiments include generating, using a machine learning model, a first output based on a sample data set. Embodiments include generating, using a fine-tuned machine learning model, a second output based on the sample data set, wherein the fine-tuned machine learning model is trained by iteratively adjusting parameters of the model based on comparing training inputs passed through multiple layers of the model to training outputs from the model. Embodiments include comparing the first output to the second output, wherein the comparing comprises identifying discrepancies between the first and the second output. Embodiments include automatically generating natural language instructions for providing to the machine learning model based on the comparing. Embodiments include performing an action using the machine learning model based on the natural language instructions and/or sending the natural language instructions to system components via a network communication protocol.

17 Claims, 5 Drawing Sheets

MACHINE LEARNING MODEL DYNAMIC PROMPT ENGINEERING

INTRODUCTION

Aspects of the present disclosure relate to techniques for dynamic prompt engineering using machine learning models. In particular, techniques described herein involve comparing an output from a generally trained machine learning model to an output generated from a fine-tuned machine learning model, identifying discrepancies between the outputs, and automatically generating a set of natural language instructions for providing to the generally trained machine learning model to minimize discrepancies between future outputs.

BACKGROUND

Every year, millions of people, businesses, and organizations around the world use software applications to assist with countless aspects of life. The use of machine learning models, including language processing machine learning models, in software applications has become widespread. Because of this, both the amount of input queries and the complexity of input queries provided to, for example, language processing machine learning models have greatly increased. Machine learning models that are not trained (e.g., fine-tuned) for the particular task for which they are used may generate inaccurate and/or inconsistent outputs due to a limited knowledge base. Inaccurate and/or inconsistent outputs may result in providing a user with erroneous results in response to a given input, which may also require the user to run the model again to re-process the input. Such inefficiency may result in significant computational costs and energy consumption associated with language processing machine learning models.

Alternatively, training machine learning models for specific use cases is often costly, with respect to both time and computing resources (e.g., as training may be based on a vast amount of unstructured data that takes time and resources to process). Such costs are compounded when a separate machine learning model must be trained for each of a variety of topic areas. Additionally, without constant updates, the data becomes nearly immediately outdated. Both of these realities may further result in inaccurate and/or inconsistent outputs generated by the machine learning model as the machine learning model lacks the most relevant and most up-to-date information required to generate optimized outputs.

Thus, there is a need in the art for improved techniques for optimizing machine learning model training and output generation.

BRIEF SUMMARY

Certain embodiments provide a method for dynamic prompt engineering using machine learning models. The method generally includes: generating, using a machine learning model, a first output based on a sample data set; generating, using a fine-tuned machine learning model, a second output based on the sample data set; comparing the first output to the second output, wherein the comparing comprises identifying discrepancies between the first output and the second output; automatically generating natural language instructions for providing to the machine learning model based on the comparing; and performing an action using the machine learning model based on the natural language instructions.

Other embodiments provide processing systems configured to perform the aforementioned method as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
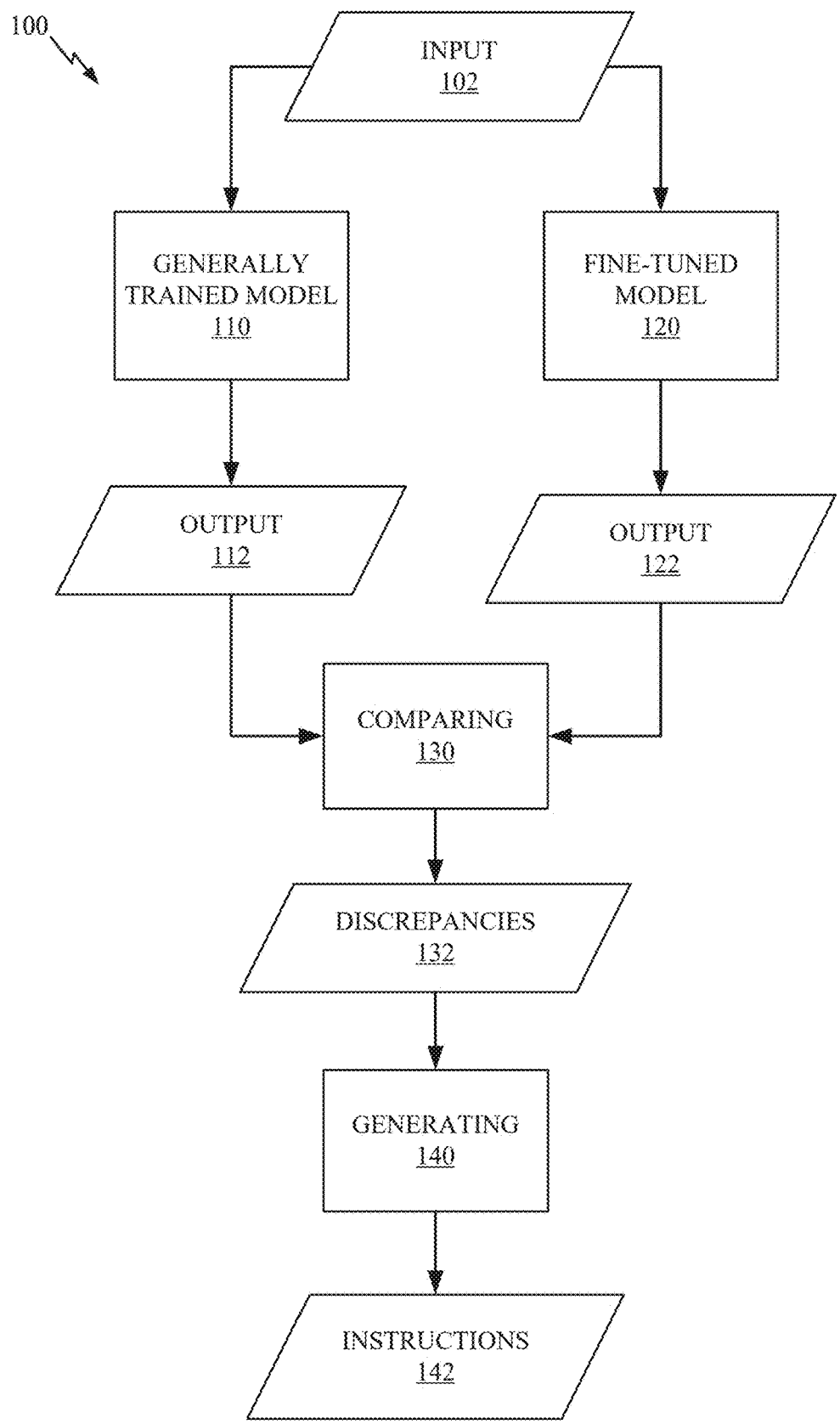
FIG. 1 depicts an example workflow related to dynamic prompt engineering using machine learning models.

Aspects of the present disclosure provide apparatuses, methods, processing systems, and computer-readable mediums for dynamic prompt engineering using machine learning models.

Machine learning models are increasingly used for a variety of tasks (such as query evaluation, output generation, etc.). Many machine learning models are trained only on general knowledge bases, which may cause incomplete and/or inaccurate results when tasked with specific queries. In order to refine results for specific topics, current techniques involve fine-tuning a large number of machine learning models (e.g., one for each topic). Training just one machine learning model requires a significant amount of time and resources, which is compounded with each additional model, resulting in vast training costs. To improve response generation and model training, techniques described herein employ a series of steps to automatically generate prompts (e.g., for providing to a model that has been trained in a general manner but that has not been fine-tuned) by comparing outputs from a fine-tuned model and the generally trained model and iteratively adjusting the prompt until the differences between the outputs are effectively zero. Such techniques result in tailored prompts that provide a more efficient process for response generation that uses significantly less resources while maintaining accuracy.

For example, a first output may be generated using a machine learning model (e.g., in response to an input provided to the model). The machine learning model may be a generally trained model or a model pre-trained on a general knowledge set. In response to the same input, a second output may be generated using a fine-tuned machine learning model (e.g., a model specially trained using data corresponding to a particular topic, subject matter, etc.). The first output may then be compared to the second output to identify any discrepancies between them (e.g., the output from the fine-tuned model may have more accurate results, more complete results, and/or the like). In some cases, the comparing may include generating embeddings of the outputs and the input and assigning the embeddings to one or more groups using a clustering algorithm (e.g., K-means clustering). Cluster analysis may then be performed on the one or more groups (e.g., using a language processing machine learning model, or using a different cluster analysis technique) to determine one or more causes of the discrepancies between the first output and the second output (e.g., why the two models generated different outputs using the same input).

Natural language instructions may then be automatically created (e.g., using the language processing machine learning model) based on the comparing. For example, the natural language instructions may include directions to the machine learning model for minimizing the discrepancies between a new output generated by the machine leaning model and the output from the fine-tuned model. In some cases, the natural language instructions may be compiled in a prompt and linguistic characteristics of the natural language instructions may be refined (e.g., correcting grammar, removing repetitive instructions, and/or the like), such as by using the language processing machine learning model.

Once the prompt is generated, it may be updated by repeating the above process. For example, the machine learning model may be provided, in addition to the input, the prompt for generating a new output. The new output may then be compared to the output from the fine-tuned model to identify any discrepancies. If the outputs match (i.e., there is less than a threshold number of discrepancies between the outputs, if semantic similarity between the outputs exceeds a threshold, and/or the like), then the prompt is complete. If there are still discrepancies between the outputs, the prompt may be refined accordingly. After the prompt is fully refined, it may be stored and/or used in conjunction with the machine learning model to generate outputs rather than using fine-tuned models (e.g., since the output will be comparably accurate).

Embodiments of the present disclosure provide numerous technical and practical effects and benefits. Current techniques for machine learning model training and response generation rely on training large numbers of machine learning models on specific topic areas, which causes high costs and uses significant computing resources. Alternatively, using generic models that are not fine-tuned results in inefficient and/or inaccurate results, which causes a diminished user experience as well as increased costs associated with re-processing incorrect outputs. The present disclosure solves this technical problem. Techniques described herein ensure more efficient, less costly processing while maintaining model and output accuracy. By automatically generating a prompt based on outputs from fine-tuned models, any machine learning model (e.g., a generic model) may then use the prompt to generate outputs with comparable accuracy but without having to first fine-tune the model, substantially reducing the amount of energy and computing resources that would otherwise be expended to generate an output with that accuracy. For example, outputs generated from a machine learning model and a fine-tuned machine learning model are compared to identify discrepancies between them and, importantly, why the discrepancies were caused. Then, natural language instructions are created and refined until there are effectively no discrepancies remaining between the outputs generated by the two models. The resulting prompt may then be used by machine learning models, in lieu of fine-tuning, to generate outputs with at least the same level of accuracy, but while saving energy and computing resources.

Example Workflows Related to Dynamic Prompt Engineering Using Machine Learning Models FIG. 1 depicts an example workflow 100 related to dynamic prompt engineering using machine learning models. For example, workflow 100 may represent a series of steps associated with generating a set of instructions based on comparing outputs from trained and generally trained machine learning models.

An input 102 may be provided to a generally trained model 110 and a fine-tuned model 120. The input 102 may comprise a natural language query seeking to elicit a response from the models. The models 110 and 120 may comprise machine learning models. In a particular example, the models are language processing machine learning models such as large language models (LLMs). For example, the models may have been trained on a large training data set in order to process natural language inputs and generate natural language content in response. In some embodiments, the models are generative pre-trained transformer (GPT) models that have been trained on a large set of training data (e.g., across a plurality of domains), and are capable as a result of such training to perform a wide variety of language-related tasks in response to natural language prompts. The models may have a large number of tunable parameters, which are iteratively adjusted during a model training process based on training data. In alternative embodiments, the models may be other types of machine learning models that are capable of generating content. For example, each of the models may be a generative adversarial network (GAN), an autoencoder model, an autoregressive model, a diffusion model, a Bayesian network, a hidden Markov model, and/or the like. In general, machine learning models such as LLMs are trained (and/or fine-tuned) by exposing the model to large datasets and iteratively adjusting internal parameters, such as to minimize an objective function. The objective function quantifies the difference between the model's predictions and the desired outputs (e.g., which may be indicated by labels in the training data or otherwise may be the target output of the model), guiding the optimization process to improve model performance over time. In particular, fine-tuned model 120 has been fine-tuned for one or more particular domains, such as for use with a particular software application or for a specific purpose, while generally trained model 110 has been trained in a more general fashion and has not been fine-tuned in such a manner.

Based on the input 102, generally trained model 110 and fine-tuned model 120 may each generate a corresponding output (outputs 112 and 122, respectively). Outputs 112 and 122 may then be compared during comparing 130. For example, output 112 may be compared to the output 122 to identify any discrepancies 132 between them, such as contradictory content, additional content, inaccurate content, and/or the like. In some embodiments, the comparing 130 may comprise generating embeddings of the outputs 112 and 122 and the input 102, assigning the embeddings to one or more groups (e.g., using a clustering algorithm), and performing cluster analysis on the one or more groups, such as by using a language processing machine learning model or another cluster analysis technique, to determine one or more causes of the discrepancies 132 between the outputs 112 and 122, as discussed below in more detail with respect to FIG. 2.

During generating 140, instructions 142 may be generated based on the discrepancies 132. The instructions 142 may comprise natural language directions for minimizing discrepancies between a new output generated by the generally trained model 110 and the output 122 (i.e., the output generated from the fine-tuned model). For example, the input 102 may contain a query seeking to determine an applicable transaction (e.g., for further evaluation, processing, etc.). Among options that are similar in transaction amount and data but that differ in transaction type, a model that has not been fine-tuned (e.g., generally trained model 110) may select a transaction related to a supplier payment, whereas a fine-tuned model may select a transaction related to a customer invoice due to having been trained on historical data that shows a preference for (or relative importance associated with) invoices. Since that discrepancy, and its cause, was discovered using semantic analysis based techniques described herein, the instructions 142 may now be generated in such manner as to direct a generic machine learning model to prioritize invoice transactions when provided with a similar input in the future (without the model having to undergo costly fine-tuning).

Instructions 142 may be generated at generating 140 using, for example, a language processing machine learning model. In one example, comparing 130 and generating 140 are performed by the same model, while in other examples comparing 130 and generating 140 may be performed by different models and/or techniques. For example, the language processing machine learning model may be prompted to identify discrepancies between outputs 112 and 122 (e.g., based on embeddings as described herein) and/or to generate instructions (e.g., natural language instructions) for minimizing such discrepancies in future model outputs.

In some embodiments, the instructions 142 may be compiled in a prompt (e.g., for providing to a machine learning model, such as generally trained model 110, that has not been fine-tuned). Additionally, linguistic characteristics of the instructions may be refined (e.g., using the same or a different language processing machine learning model to model(s) used at comparing 130 and/or generating 140), such as correcting grammar, removing repetitive instructions, and/or the like in order to maintain clarity and succinctness. Once finalized, the instructions 142 may be stored for future use, tested for accuracy (and updated accordingly), and/or used for response generation by other machine learning models that have not been fine-tuned, as discussed in more detail below with respect to FIG. 3. For example, the instructions may be used to direct a machine learning model (i.e., that has not been fine-tuned) to generate outputs that will have the same accuracy as a model that has been fine-tuned, but without having to expend the significant resources to fine-tune that model. Other instructions may also be created for a wide variety of topic areas, further conserving resources (e.g., by not training multiple models) while maintaining accuracy in the respective outputs.

Figure 2:
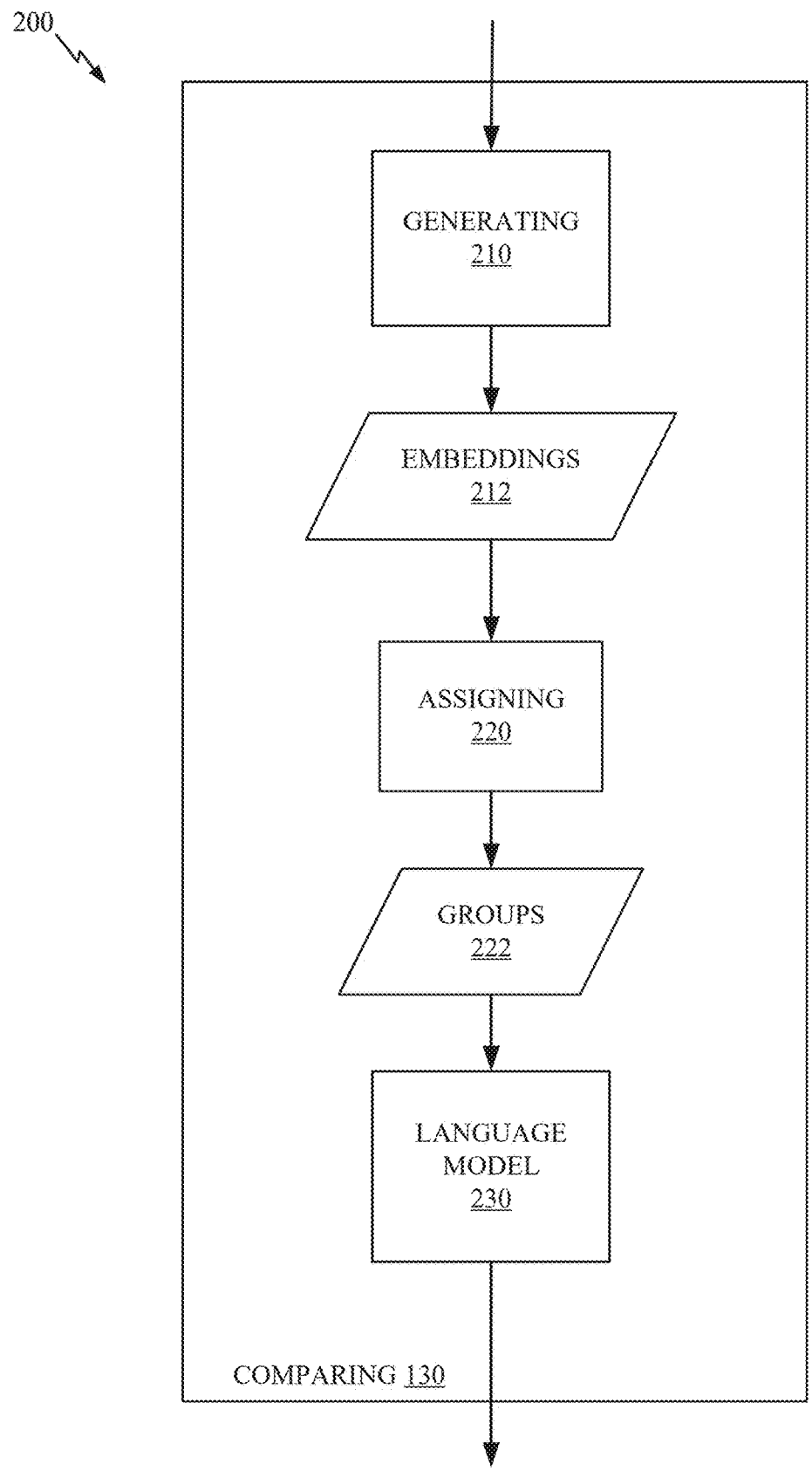
FIG. 2 depicts an additional example workflow related to dynamic prompt engineering using machine learning models.

FIG. 2 depicts an additional example workflow 200 related to dynamic prompt engineering using machine learning models. In particular, FIG. 2 depicts a series of steps by which the outputs from the fine-tuned and generally trained machine learning models are compared.

After outputs 112 and 122 are generated by the respective machine learning models (e.g., generally trained model 110 and fine-tuned model 120), the outputs are compared during comparing 130 to identify differences between them, as well as the underlying reasons for the differences (which helps create more precise and complete instructions as detailed above in FIG. 1).

Comparing 130 may first comprise generating, during generating 210, embeddings 212 of the outputs (e.g., outputs 112 and 122) as well as the input (e.g., input 102) processed by both machine learning models. An embedding generally refers to a vector representation of an entity (e.g., a document) that represents the entity as a vector in n-dimensional space such that similar entities are represented by vectors that are close to one another in the n-dimensional space. Embeddings may be generated through the use of an embedding model, such as a neural network or other type of machine learning model that learns a representation (embedding) for an entity through a training process that trains the neural network based on a data set, such as a plurality of features of a plurality of entities. In one example, an embedding model used to generate embeddings comprises a Bidirectional Encoder Representations from Transformer (BERT) model, which involves the use of masked language modeling to determine embeddings. In a particular example, the embedding model comprises a Sentence-BERT model. In other embodiments, the embedding model may involve embedding techniques such as Word2Vec and GloVe embeddings. These are included as examples, and other techniques for generating embeddings are possible.

The embeddings 212 may then be assigned to one or more groups 222 during assigning 220. For example, the embeddings 312 may be assigned to the groups 222 using a clustering algorithm, such as K-means clustering. K-means clustering may refer to a process by which a number of centroids are created in unlabeled data and each data point is matched to the nearest centroid (e.g., based on a Euclidean distance). Some, or all, of the embeddings from each group of groups 222 may then be passed to language model 230. Language model 230 may be a language processing machine learning model such as an LLM. In some embodiments, the number of samples selected (e.g., for processing by the language model 230) may be proportional to the variance (i.e., the spread of the data points), within each group of groups 222 (e.g., the higher the variance, the larger the sample size required to optimize token usage for cluster analysis), which may result in a more resource-efficient operation of language model 230 by providing a more focused input data set rather than providing all potentially relevant embeddings. The language model 230 may analyze the groups 222 to determine the discrepancies in the outputs in addition to reasons for those discrepancies (e.g., a differing transaction type that was prioritized in the fine-tuned model but not the generic model). The results may be collected (e.g., as discrepancies 132 of FIG. 1, which may also include the reasons for the discrepancies) and passed along for further processing (e.g., used to generate instructions 142 as discussed above in FIG. 1).

Figure 3:
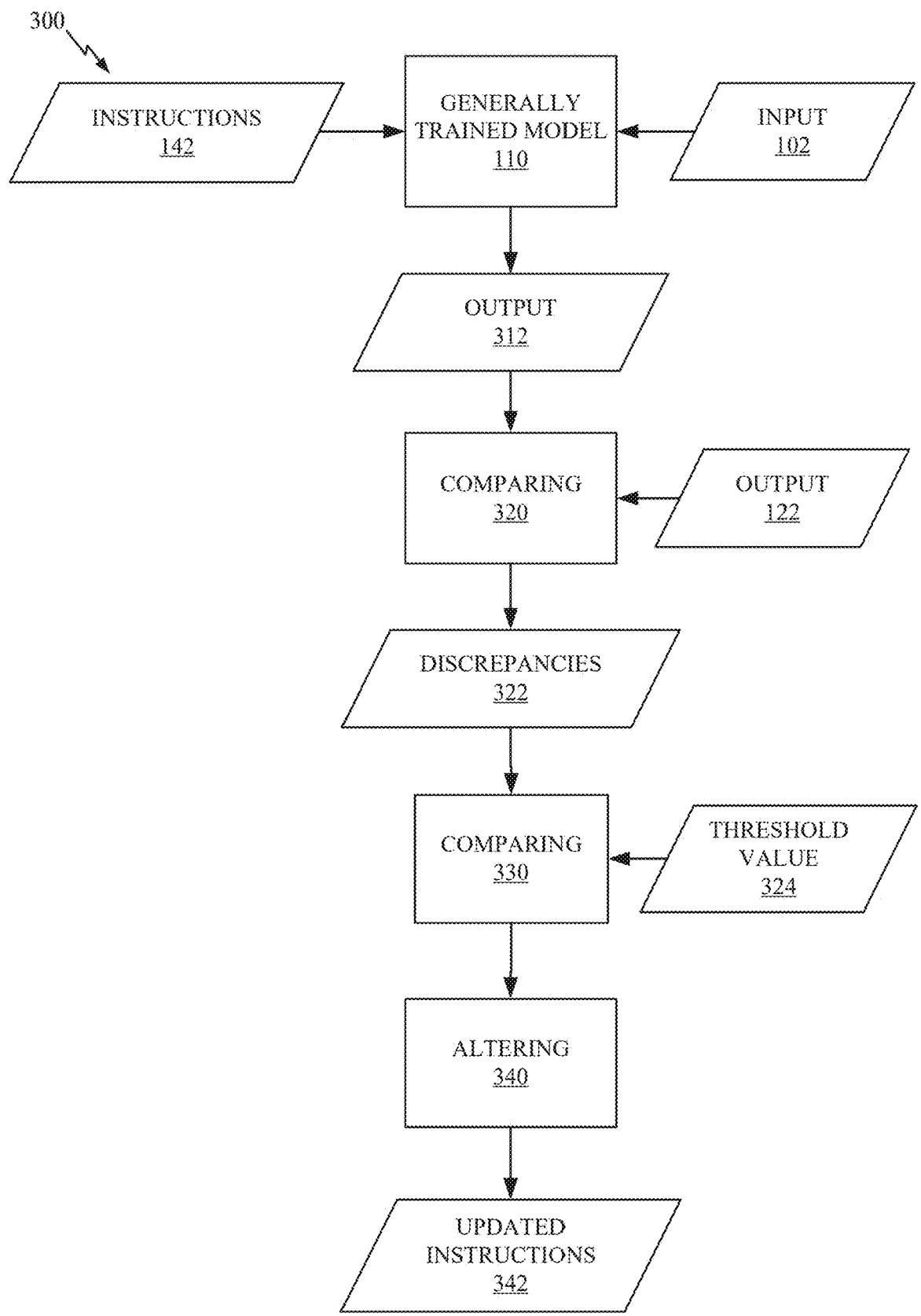
FIG. 3 depicts an additional example workflow related to dynamic prompt engineering using machine learning models.

FIG. 3 depicts an additional example workflow 300 related to dynamic prompt engineering using machine learning models. In particular, FIG. 3 depicts a series of steps associated with iteratively updating the instructions based on comparing new outputs generated based on the instructions.

Once the instructions 142 are generated (e.g., by one or more steps as described above with respect to FIG. 1), an action may be performed using the instructions 142. For example, the instructions 142 may be stored (e.g., for future use) and/or provided to a machine learning model, along with an input, for use in generating improved outputs (without having to first fine-tune the machine learning model). In some embodiments, the instructions 142 may be updated through further iterations of the process. For example, the instructions 142 and input 102 may be provided back to the generally trained model 110, which will generate a new output 312 in response. The output 312 may then be compared, during comparing 320, to output 122 (i.e., the original output from the fine-tuned model). Based on the comparing, which may comprise one or more steps of comparing 130 from FIG. 1 and/or FIG. 2, discrepancies 322 may be identified (along with the underlying causes for the discrepancies), if any exist.

During comparing 330, the discrepancies 322 may be compared to a threshold value 324 to determine whether the instructions 142 will undergo further processing. For example, if there are no discrepancies, if there are only a small number of discrepancies, and/or if there are only minor discrepancies (e.g., output 322 and 122 only differ in formatting and/or the like), the process is complete and the instructions are ready for use. If the discrepancies exceed the threshold, however, the instructions 142 may be altered, during altering 340, to produce updated instructions 342. Altering 340 may comprise adding new instructions, changing the existing instructions, and/or refining the instructions (e.g., grammatical edits, etc.) as described in FIG. 1. For example, altering 340 may be performed by a language processing machine learning model, such as the same or a different model than model(s) that may be used to identify discrepancies and/or generate instructions 142. The process may be repeated until the discrepancies are eliminated or fall below the threshold value 324. The updated instructions 342 may then be stored and/or used by one or more machine leaning models for output generation. Outputs generated by a generally trained machine learning model based on instructions 142 or updated instructions 342 may be more accurate and/or may contain fewer discrepancies with respect to alternative outputs that would be produced by a fine-tuned model, as compared to outputs that would be generated by the generally trained machine learning model without such instructions, as a result of techniques described herein.

Figure 4:
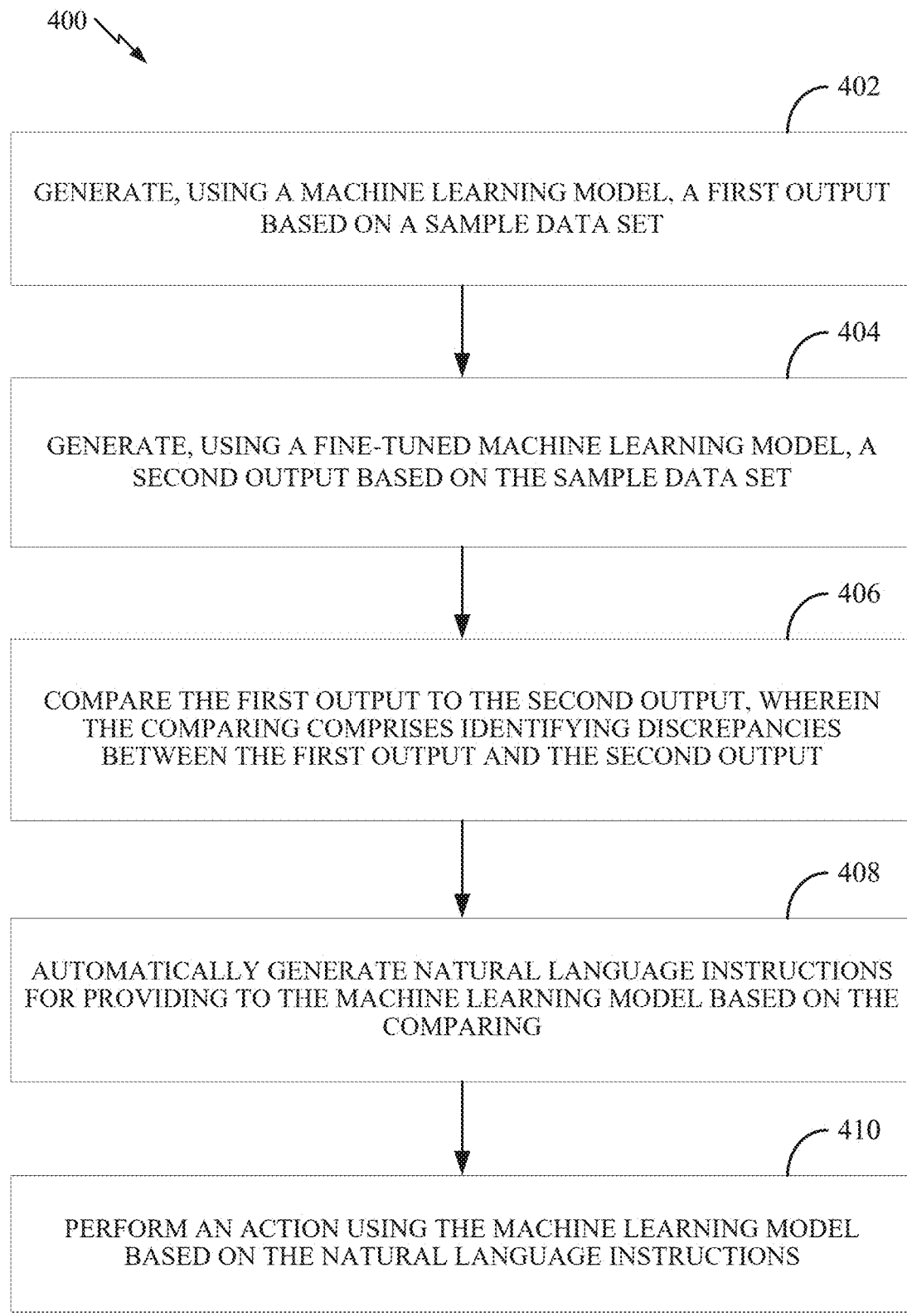
FIG. 4 depicts example operations related to dynamic prompt engineering using machine learning models.

Example Operations Related to Dynamic Prompt Engineering Using Machine Learning Models FIG. 4 depicts example operations 400 related to dynamic prompt engineering using machine learning models. For example, operations 400 may be performed by one or more of the components described with respect to FIG. 1, FIG. 2, and/or FIG. 3.

Operations 400 begin at step 402 with generating, using a machine learning model, a first output based on a sample data set.

Operations 400 continue at step 404 with generating, using a fine-tuned machine learning model, a second output based on the sample data set.

Operations 400 continue at step 406 with comparing the first output to the second output, wherein the comparing comprises identifying discrepancies between the first output and the second output. In some embodiments, the comparing the first output to the second output comprises assigning embeddings generated from the first and second outputs and an input query to one or more groups, wherein the assigning is performed using a clustering algorithm. According to certain embodiments, the method further comprises performing cluster analysis on the one or more groups using a language processing machine learning model to determine one or more causes of the discrepancies between the first output and the second output.

Operations 400 continue at step 408 with automatically generating natural language instructions for providing to the machine learning model based on the comparing. Some embodiments provide that the natural language instructions comprise directions for minimizing the discrepancies between the second output and a future output generated by the machine learning model. In certain embodiments, the automatically generating the natural language instructions for providing to the machine learning model based on the comparing further comprises compiling the natural language instructions in a prompt and refining linguistic characteristics of the natural language instructions using a language processing machine learning model.

Operations 400 continue at step 410 with performing an action using the machine learning model based on the natural language instructions. According to some embodiments, the performing the action using the machine learning model based on the natural language instructions comprises one or more of: updating the natural language instructions until a measure of similarity between a new output and the second output exceeds a threshold value; storing the natural language instructions; or generating, in response to one or more input queries, one or more corresponding outputs using the machine learning model based on the natural language instructions and the one or more input queries. Certain embodiments provide that the updating the natural language instructions until the measure of similarity between the new output and the second output exceeds the threshold value comprises: generating, using the machine learning model, the new output based on the natural language instructions and the sample data set; comparing the new output to the second output; and altering the natural language instructions based on the comparing.

Figure 5:
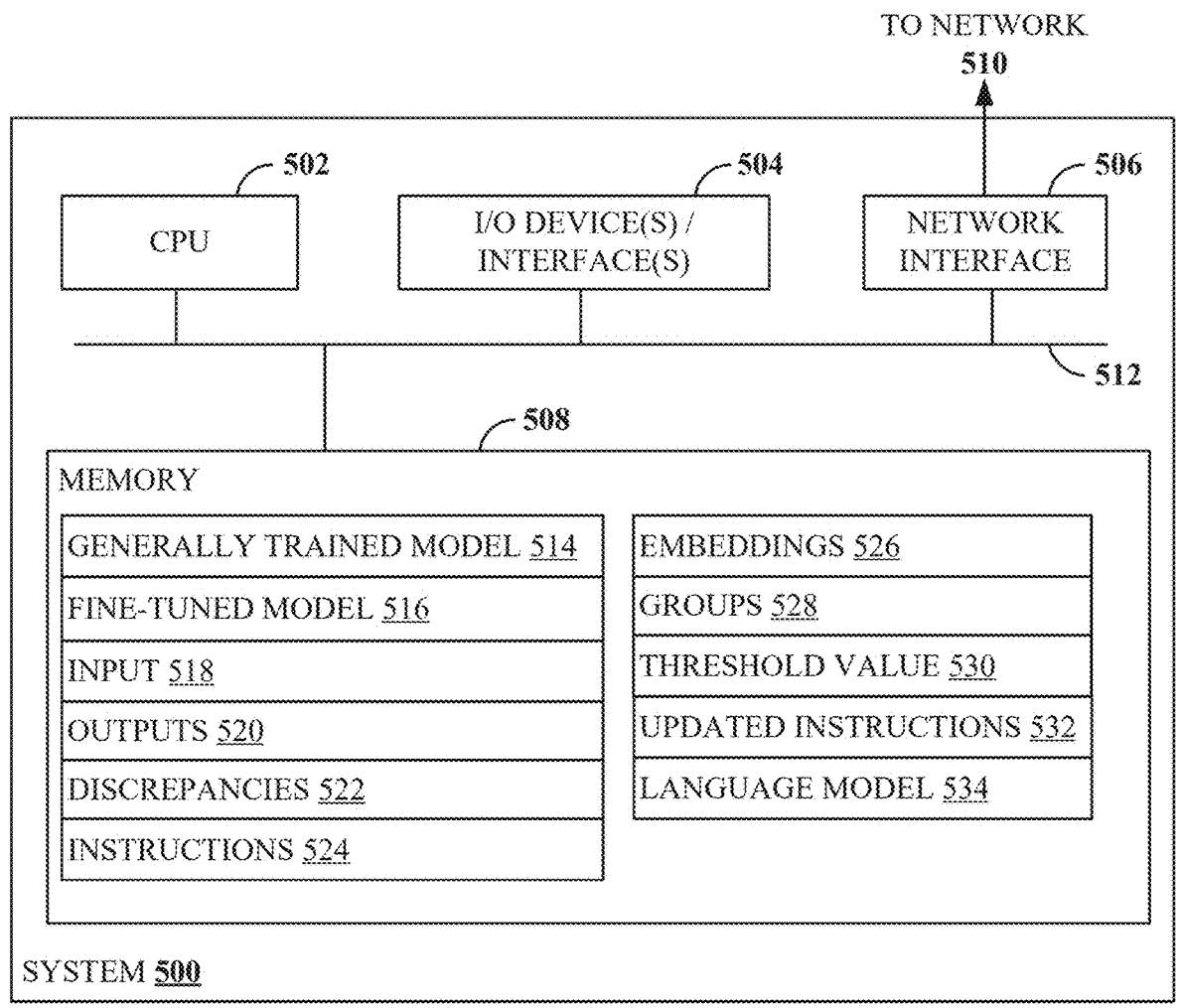
FIG. 5 depicts an example of a processing system for dynamic prompt engineering using machine learning models.

Example of a Processing System for Dynamic Prompt Engineering Using Machine Learning Models FIG. 5 illustrates an example system 500 with which embodiments of the present disclosure may be implemented. For example, system 500 may be configured to perform operations 400 of FIG. 4 and/or to implement one or more components as in FIG. 1, FIG. 2, or FIG. 3.

System 500 includes a central processing unit (CPU) 502, one or more I/O device interfaces that may allow for the connection of various I/O devices 504 (e.g., keyboards, displays, mouse devices, pen input, etc.) to the system 500, network interface 506, a memory 508, and an interconnect 512. It is contemplated that one or more components of system 500 may be located remotely and accessed via a network 510. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes generally trained model 514, fine-tuned model 516, input 518, outputs 520, discrepancies 522, and instructions 524. Generally trained model 514 may be representative of generally trained model 110 of FIG. 1 and FIG. 3. Fine-tuned model 516 may be representative of fine-tuned model 120 of FIG. 1. Input 518 may be representative of input 102 of FIG. 1 and FIG. 3. Outputs 520 may be representative of output 112 of FIG. 1, output 122 of FIG. 1 and FIG. 3, and output 322 of FIG. 3. Discrepancies 522 may be representative of discrepancies 132 of FIG. 1 and discrepancies 322 of FIG. 3. Instructions 524 may be representative of instructions 142 of FIG. 1 and FIG. 3.

Memory 508 further comprises embeddings 526 which may correspond to embeddings 212 of FIG. 2. Memory 508 further comprises groups 528, which may correspond to groups 222 of FIG. 2. Memory 508 further comprises threshold value 530, which may correspond to threshold value 324 of FIG. 3. Memory 508 further comprises updated instructions 532, which may correspond to updated instructions 342 of FIG. 3. Memory 508 further comprises language model 534, which may correspond to language model 230 of FIG. 2. It is noted that in some embodiments, system 500 may interact with one or more external components, such as via network 510, in order to retrieve data and/or perform operations. Furthermore, techniques described herein may be implemented via more or fewer components than those shown and described with respect to FIG. 5, such as on one or more computing systems.

ADDITIONAL CONSIDERATIONS

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a c c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for dynamic prompt engineering using machine learning models, comprising:
    generating, using a machine learning model, a first output based on a sample data set;
    generating, using a fine-tuned machine learning model, a second output based on the sample data set;
    comparing the first output to the second output, wherein the comparing comprises identifying discrepancies between the first output and the second output and assigning, using a clustering algorithm, embeddings generated from the first and second outputs and an input query to one or more groups;
    automatically generating natural language instructions for providing to the machine learning model based on the comparing; and
    performing an action using the machine learning model based on the natural language instructions.

2. The method of claim 1, further comprising performing cluster analysis on the one or more groups using a language processing machine learning model to determine one or more causes of the discrepancies between the first output and the second output.

3. The method of claim 1, wherein the natural language instructions comprise directions for minimizing the discrepancies between the second output and a future output generated by the machine learning model.

4. The method of claim 1, wherein the automatically generating the natural language instructions for providing to the machine learning model based on the comparing further comprises compiling the natural language instructions in a prompt and refining linguistic characteristics of the natural language instructions using a language processing machine learning model.

5. The method of claim 1, wherein the performing the action using the machine learning model based on the natural language instructions comprises one or more of:
    updating the natural language instructions until a measure of similarity between a new output and the second output exceeds a threshold value;
    storing the natural language instructions; or
    generating, in response to one or more input queries, one or more corresponding outputs using the machine learning model based on the natural language instructions and the one or more input queries.

6. The method of claim 5, wherein the updating the natural language instructions until the measure of similarity between the new output and the second output exceeds the threshold value comprises:
generating, using the machine learning model, the new output based on the natural language instructions and the sample data set;
comparing the new output to the second output; and
altering the natural language instructions based on the comparing.

7. A system for dynamic prompt engineering using machine learning models, comprising:
one or more processors; and
a memory comprising instructions that, when executed by the one or more processors, cause the system to:
generate, using a machine learning model, a first output based on a sample data set;
generate, using a fine-tuned machine learning model, a second output based on the sample data set;
compare the first output to the second output, wherein the comparing comprises identifying discrepancies between the first output and the second output and assigning, using a clustering algorithm, embeddings generated from the first and second outputs and an input query to one or more groups;
automatically generate natural language instructions for providing to the machine learning model based on the comparing; and
perform an action using the machine learning model based on the natural language instructions.

8. The system of claim 7, further comprising performing cluster analysis on the one or more groups using a language processing machine learning model to determine one or more causes of the discrepancies between the first output and the second output.

9. The system of claim 7, wherein the natural language instructions comprise directions for minimizing the discrepancies between the second output and a future output generated by the machine learning model.

10. The system of claim 7, wherein the automatically generating the natural language instructions for providing to the machine learning model based on the comparing further comprises compiling the natural language instructions in a prompt and refining linguistic characteristics of the natural language instructions using a language processing machine learning model.

11. The system of claim 7, wherein the performing the action using the machine learning model based on the natural language instructions comprises one or more of:
updating the natural language instructions until a measure of similarity between a new output and the second output exceeds a threshold value;
storing the natural language instructions; or
generating, in response to one or more input queries, one or more corresponding outputs using the machine learning model based on the natural language instructions and the one or more input queries.

12. The system of claim 11, wherein the updating the natural language instructions until the measure of similarity between the new output and the second output exceeds the threshold value comprises:
generating, using the machine learning model, the new output based on the natural language instructions and the sample data set;
comparing the new output to the second output; and
altering the natural language instructions based on the comparing.

13. A non-transitory computer readable medium comprising instructions that, when executed by one or more processors of a computing system, cause the computing system to:
generate, using a machine learning model, a first output based on a sample data set;
generate, using a fine-tuned machine learning model, a second output based on the sample data set;
compare the first output to the second output, wherein the comparing comprises identifying discrepancies between the first output and the second output and assigning, using a clustering algorithm, embeddings generated from the first and second outputs and an input query to one or more groups;
automatically generate natural language instructions for providing to the machine learning model based on the comparing; and
perform an action using the machine learning model based on the natural language instructions.

14. The non-transitory computer readable medium of claim 13, further comprising performing cluster analysis on the one or more groups using a language processing machine learning model to determine one or more causes of the discrepancies between the first output and the second output.

15. The non-transitory computer readable medium of claim 13, wherein the natural language instructions comprise directions for minimizing the discrepancies between the second output and a future output generated by the machine learning model.

16. The non-transitory computer readable medium of claim 13, wherein the automatically generating the natural language instructions for providing to the machine learning model based on the comparing further comprises compiling the natural language instructions in a prompt and refining linguistic characteristics of the natural language instructions using a language processing machine learning model.

17. The non-transitory computer readable medium of claim 13, wherein the performing the action using the machine learning model based on the natural language instructions comprises one or more of:
updating the natural language instructions until a measure of similarity between a new output and the second output exceeds a threshold value;
storing the natural language instructions; or
generating, in response to one or more input queries, one or more corresponding outputs using the machine learning model based on the natural language instructions and the one or more input queries.

* * * * *